(12) United States Patent
Hirako

(10) Patent No.: US 6,847,862 B2
(45) Date of Patent: Jan. 25, 2005

(54) CONVEYOR SYSTEM

(75) Inventor: Tomoaki Hirako, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 59 days.

(21) Appl. No.: 10/239,243

(22) PCT Filed: Jan. 23, 2001

(86) PCT No.: PCT/JP01/00416

§ 371 (c)(1),
(2), (4) Date: Dec. 23, 2002

(87) PCT Pub. No.: WO02/058894

PCT Pub. Date: Aug. 1, 2002

(65) Prior Publication Data

US 2004/0109752 A1 Jun. 10, 2004

(51) Int. Cl.[7] .............................................. G06F 19/00
(52) U.S. Cl. ...................... 700/245; 710/125; 710/240; 318/568.19; 348/125
(58) Field of Search ................................ 700/245, 125, 700/240; 318/568.19; 348/125, 94, 161; 414/789; 270/58.11; 493/178; 382/106, 141; 271/273, 240

(56) References Cited

U.S. PATENT DOCUMENTS

| | | | | |
|---|---|---|---|---|
| 4,148,061 A | * | 4/1979 | Lemelson | 348/125 |
| 4,338,626 A | * | 7/1982 | Lemelson | 348/94 |
| 4,954,762 A | * | 9/1990 | Miyake et al. | 318/568.19 |
| 5,067,012 A | * | 11/1991 | Lemelson | 348/161 |
| 5,119,190 A | * | 6/1992 | Lemelson | 348/95 |
| 5,128,753 A | * | 7/1992 | Lemelson | 382/141 |
| 5,163,008 A | * | 11/1992 | Gerber et al. | 700/240 |
| 5,249,045 A | * | 9/1993 | Lemelson | 348/92 |
| 5,286,543 A | * | 2/1994 | Ungpiyakul et al. | 428/32.24 |
| 5,341,633 A | * | 8/1994 | Nishikawa et al. | 57/264 |
| 5,351,078 A | * | 9/1994 | Lemelson | 348/135 |
| 5,411,252 A | * | 5/1995 | Lowell | 271/240 |
| 5,413,212 A | * | 5/1995 | Bodie | 198/718 |
| 5,433,431 A | * | 7/1995 | Lowell | 271/273 |
| 5,484,255 A | * | 1/1996 | Lowell | 414/789 |
| 5,518,228 A | * | 5/1996 | Bodie et al. | 270/58.11 |
| 5,608,639 A | * | 3/1997 | Twardowski et al. | 700/125 |
| 5,827,162 A | * | 10/1998 | Rubin et al. | 493/178 |
| 6,026,172 A | * | 2/2000 | Lewis et al. | 382/106 |
| 6,032,343 A | * | 3/2000 | Blanch et al. | 29/33 R |
| 6,081,981 A | * | 7/2000 | Demarest et al. | 29/407.08 |
| 2003/0207742 A1 | * | 11/2003 | Hazlehurst et al. | 483/36 |

OTHER PUBLICATIONS

Viswanadham et al., Fault detection and deagnosis of automated manufacturing systems, 1998, IEEE, pp. 2301-2301-2306.*

Yamauchi et al., On cooperative conveyance by tow mobile robots, 1993, IEEE, pp. 1478-1481.*

Patent Abstracts of Japan. Japanese Publication No. 06079674. Published Mar. 22, 1994.

Patent Abstracts of Japan. Japanese Publication No. 10044076. Published Feb. 17, 1998.

Patent Abstracts of Japan. Japanese Publication No. 10217171. Published Aug. 18, 1998.

* cited by examiner

Primary Examiner—Thomas C. Black
Assistant Examiner—McDieunel Marc
(74) Attorney, Agent, or Firm—Sughrue, Mion, PLLC

(57) ABSTRACT

A conveying apparatus is provided with a control device for performing infinite rotation control of rotation of a strut or wrist shaft of a robot conveying an article and a drive shaft of a conveyor. The control device comprises a rotary shaft (6) rotationally driven, a drive (7) for rotating the rotary shaft, an encoder for detecting a rotation of the rotary shaft, a servo control device (22) for controlling the drive (7) based on a program command, a main control device (10) for controlling rotation, and an infinite rotation control device (12) for controlling infinite rotation. The program command is prepared and position control is carried out based on a reference encoder value. In the case of issuance of a command from a command circuit, by adding or subtracting an encoder value equivalent to a position-moving amount, the reference encoder value is changed and stored. Thus, it is possible to obtain a conveying apparatus capable of performing infinite rotation control under the state of maintaining any operation range at any deceleration ratio.

8 Claims, 9 Drawing Sheets

CONVEYOR SYSTEM

This application is a 371 of PCT/JP01/00416 filed Jan. 23, 2001.

TECHNICAL FIELD

The present invention relates to improvements in a conveying apparatus such as a robot, a conveyor or the like.

BACKGROUND ART

Hitherto, to turn a strut or a wrist shaft at a distal end portion of a robot, to drive a conveyor and the like, an infinite rotation control, in which each of rotary shafts of the robot and the conveyor performs a turn of not less than 360 degrees, has been employed.

This type of conventional conveying apparatus is disclosed, for example, in Japanese Patent Laid-Open No. 79674/1994. In this conventional apparatus, to achieve the infinite rotation control capable of turning a wrist shaft of a robot in the order of 360 degrees and a predetermined angle positioning control by using the same hardware, the following control operation is carried out. That is, at the time of infinite rotation control, the infinite rotation is conducted by resetting a signal from an encoder mounted on a drive unit such as a motor to turn the wrist shaft each time the wrist shaft make the rotation, and counting up number of rotation every time. On the other hand, at the time of the angle positioning control, the angle positioning is conducted by causing the drive to rotate until a signal from the encoder comes to be a predetermined value, establishing a reference encoder value reset each time of turning as origin. Further, in the disclosed conveying apparatus, by setting a rotation ratio R between the wrist shaft and the drive to be $1:2^n$ (n is an integer), accurate return of the wrist shaft to the origin can be performed without any mechanical gap even after the infinite rotation.

Moreover, The Japanese Patent Laid-Open No. 44076/1998 discloses another conveying apparatus, in which the rotation ratio R between the wrist shaft and the drive can be set arbitrarily to be, for example, N/M. When the drive makes N rotations, a rotation counter counts up M, thereby achieving the infinite rotation. Further a rotational angle of the wrist shaft is calculated based on a rotation amount of the motor drive shaft until there is an increase in M counts.

Furthermore, the Japanese Patent Laid-Open No. 217171/1998 discloses a technology in which a signal from an encoder mounted on a drive for turning a wrist shaft is reset each time it make the rotation, and number of rotation is counted up every time, thereby achieving the infinite rotation. Further, by setting the rotation ratio R between the wrist shaft and the drive to be $1:2^n$ (n is an integer), the drive is rotated in a direction close to an origin, whereby accurate return of the wrist shaft to the origin can be performed in a short time. Furthermore, after setting a current value to a working origin, that is, to a value of rotational angle from the viewpoint of the reference encoder value, the wrist shaft is returned to the origin, thereby solving a disadvantage of the mechanical gap.

In the conventional conveying apparatus described above, utilizing an action that the rotary shaft makes M rotations by deceleration means when the drive makes N rotations, the encoder value is changed when the drive has made N rotations. That is, the encoder value can be changed only in such a limited case that the rotation number M of the rotary shaft and the rotation number N of the drive are respectively integers or values conforming to a resolution of the encoder. However, a problem exists in that setting below the resolution is impossible, and that conduction of conveying work repeatedly brings about an accumulated error, making it impossible to carry out an exact conveying work.

Moreover, in the case of linearly moving any article to be conveyed in conformity with a distance between one step and another such as carried out by a conveyor belt in manufacturing line, the drive for driving the conveyor requires plural times rotation control and positioning control at a predetermined angle. Further in the case that the deceleration means is a belt, or that means for conveying the article to be conveyed is a conveyor belt, it is impossible to indicate the rotation ratio of the deceleration means in the form of an integer. Therefore, a problem exists in that conduction of any conveying work repeatedly brings about an accumulated error, making it impossible to carry out an accurate conveying work.

Furthermore, in the case of repeating plural times linear movement or rotational movement in one direction at all times, when executing a program based on a current value, the current value increases sequentially in order. Therefore, a value indicative of a position command in the program comes to be larger gradually, and thus a problem exits in that the program becomes further complicated.

DISCLOSURE OF INVENTION

The present invention is made to solve the above-discussed problems, and has an object of obtaining a conveying apparatus capable of using deceleration means of arbitrary rotation ratio, and changing a reference encoder value for each arbitrary amount of rotation, thereby omitting any extra operation for position control and making a program easy.

Another object of the invention is to provide a conveying apparatus capable of being adapted to an infinite linear-moving shaft such as used in a conveyor, changing the reference encoder value for each arbitrary moving amount, and also changing the indication of a current value.

There is provided a conveying apparatus according to the invention in which an output value of an encoder that varies in conformity with driving of a drive is detected at all times, a reference encoder value at the origin of a program is stored, and a movement command is produced using the reference encoder value as the origin to execute the program. In the case that any movement command for moving the reference encoder value is issued from the program, an encoder value that is equivalent to a specified amount of rotation or moving distance is added to or subtracted from a previous reference encoder value. Thus a position control is carried out in conformity with a subsequent operation program.

In the mentioned conveying apparatus, a difference between an ideal reference encoder value obtained by adding a value that is equivalent to a moving distance to or subtracting from the reference encoder value, and the reference encoder value indicated in integer and actually set, is stored as an error. In the case of setting the next reference encoder value, the mentioned difference is compensated and outputted, so that the error is controlled to be less than a unit value detected by the encoder at all times.

In the conveying apparatus arranged above-described according to this invention, the infinite rotation control capable of arbitrarily setting a rotation number ratio R between a rotation number N of the drive and a rotation number M of the rotary shaft, and positioning every time at a predetermined angle becomes possible. As a result, an advantage is performed such that any extra operation can be omitted, and the program becomes simple.

In addition, even when applying to a linear-moving shaft such as used in a conveyor, an operation ratio R between the rotation number N of the drive and a moving distance Mmm of the linear-moving shaft can be set arbitrarily. As a result, an advantage is performed such that the program becomes simple, and furthermore it becomes easy to get hold of a position just by resetting a current value to zero after having reached a predetermined distance.

Furthermore, in the conveying apparatus according to the invention, when calculating the reference encoder value for achieving the mentioned continuous position control, a difference between an ideal reference encoder value obtained by computation and an actually set reference encoder value is stored. When setting the next reference encoder value, the difference is compensated and outputted. As a result, an advantage is performed such that position error can be less than a unit value detected by the encoder at all times.

BEST MODE FOR CARRYING OUT THE INVENTION

Embodiment 1

Figure 1:
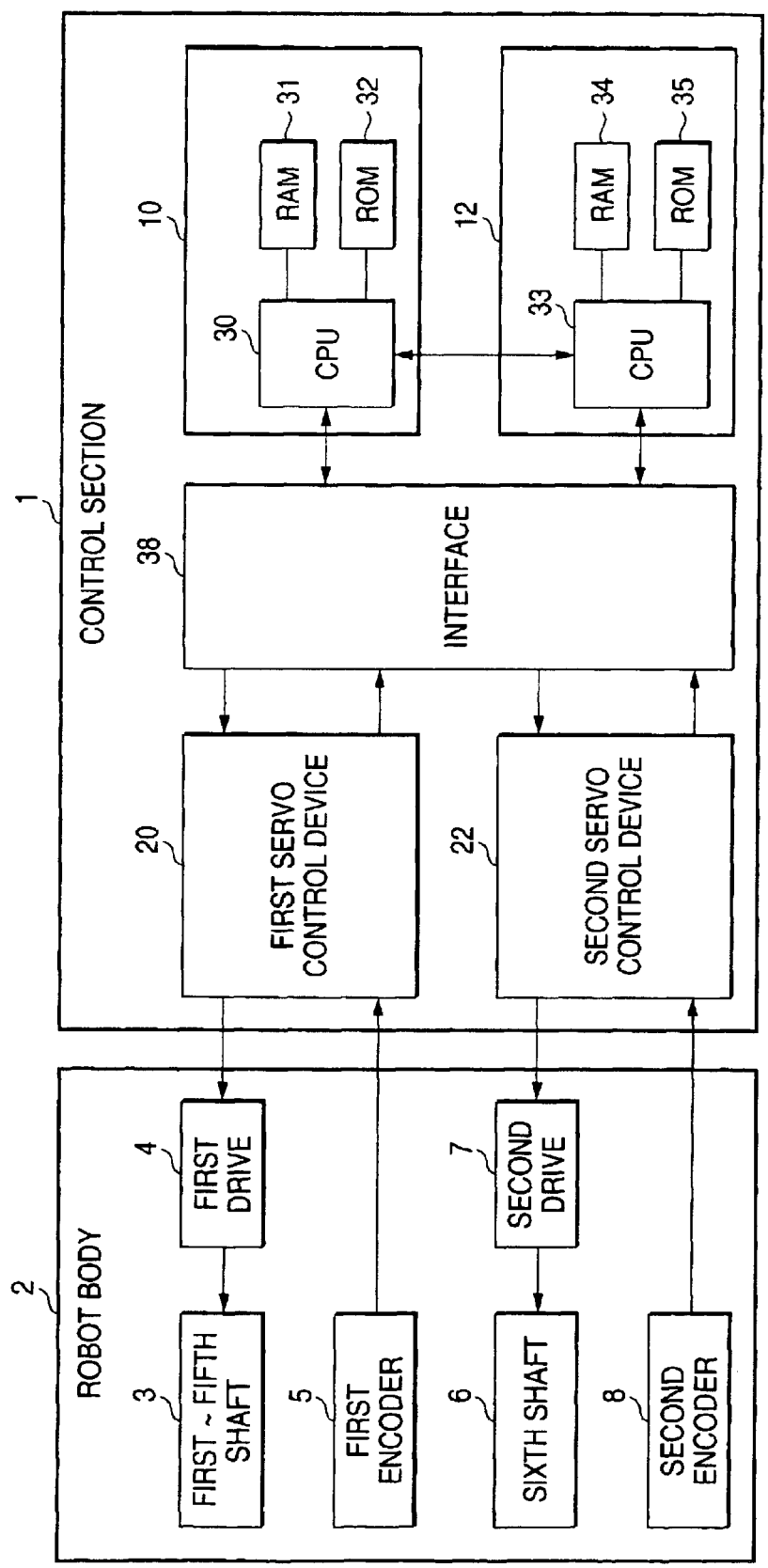
FIG. 1 is a block diagram of a robot apparatus including an infinite rotary shaft according to Embodiment 1 of the present invention.
Figure 2:
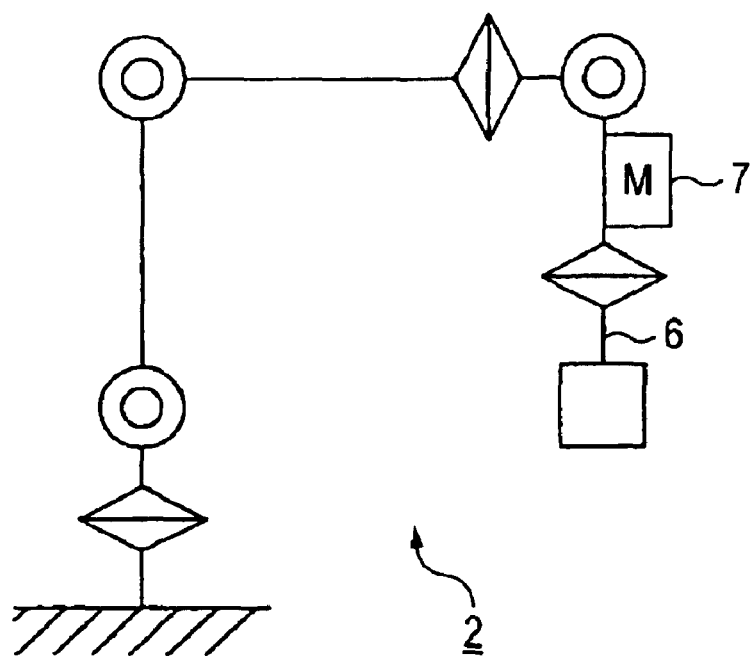
FIG. 2 is a schematic view showing a shaft relation of a robot body according to Embodiment 1.
Figure 3:
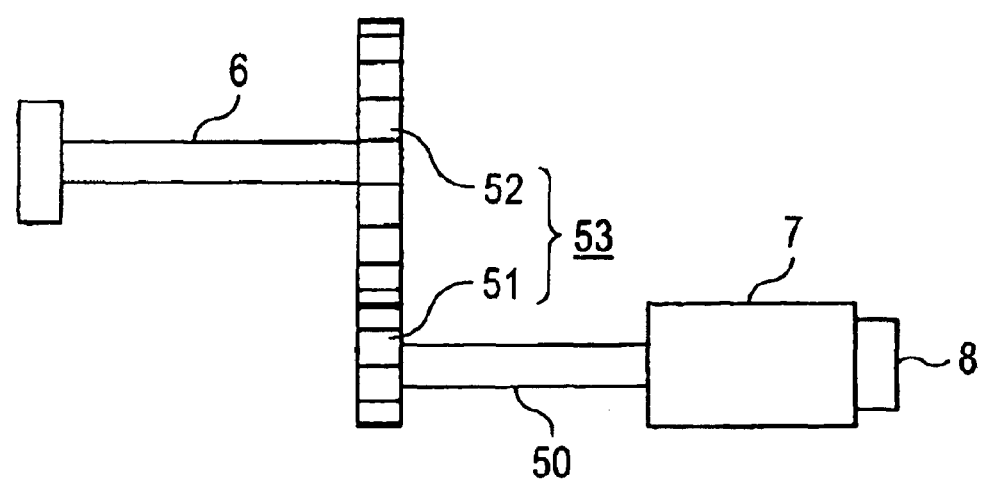
FIG. 3 is a schematic view of deceleration means of a sixth shaft according to the first embodiment.

FIG. 1 is a block diagram of a robot apparatus including an infinite rotary shaft according to Embodiment 1 of the present invention, and FIG. 2 is a schematic view showing a shaft relation of a robot body. FIG. 3 is a schematic view of deceleration means of a sixth shaft.

In the drawings, a conveying apparatus comprises a robot body 2 and a control section 1. The robot body 2 includes first to fifth shafts 3 that are servo-controlled by means of a first servo control device 20 and drive and turn an arm. Further, the robot body 2 includes a sixth shaft 6 that is servo-controlled by means of a second servo control device 22 and infinitely rotates a wrist shaft mounted on a distal end portion of the fifth shaft.

Furthermore, the first to fifth shafts 3 is provided with a first encoder 5 for detecting a rotation amount thereof, and the sixth shaft 6 is provided with a second encoder 8 for detecting a rotation amount thereof. The first to fifth shafts 3 are rotationally driven by means of a first drive 4 such as an electric motor, and the first encoder 5 detects a rotational angle of the first drive 4. The sixth shaft 6 is driven by a second drive 7, and the second encoder 8 detects a rotational angle of the second drive 7. The first encoder 5 and the first drive 4 are respectively provided corresponding to each of the first to fifth shafts 3 (five shafts).

The control section 1 side comprises a main control device 10, an infinite rotation control device 12, an interface 38, the first servo control device 20 and the second servo control device 22. The main control device 10 comprises a CPU 30, a ROM 32 for storing a control program, a RAM 31 for storing a working area of the program and parameters such as a resolution value of the encoder, a rotation ratio of deceleration means and a reference encoder value. The infinite rotation control device 12 comprises a CPU 33, a ROM 35 for storing an infinite rotation control program, and a RAM 34 for storing a working area and a processing result of the program. In this embodiment, the CPU, ROM and RAM are disposed independently in each of the main control device 10 and the infinite rotation control device 12. However it is also preferable that a set of the CPU, ROM and RAM is shared by the main control device 10 and the infinite rotation control device 12.

Deceleration means 53 is disposed between the second drive 7 and the sixth shaft 6. This deceleration means 53 is composed of a first gear 51 mounted on an output shaft 50 of the drive 7 and a second gear 52 mounted on the sixth shaft 6. The second encoder 8 is mounted on the output shaft 50, and rotates integrally with the output shaft 50. Number of teeth of the first gear 51 is set to m (for example, 30 teeth), and number of teeth of the second gear 52 is set to n (for example, 100 teeth). In this arrangement, a ratio R between the rotation number of the second drive 7 and that of the sixth shaft 6 is n/m (in this example, R=100/30=10/3=N/M; N=10, M=3). Accordingly when the second drive 7 makes N (for example, 10) rotations, the sixth shaft 6 makes M (for example, 3) rotations.

In addition, in this embodiment, the deceleration means 53 comprises two gears, it is, however, preferable that the deceleration means 53 comprises not less than three gears. Further, it is also preferable that the deceleration means comprises other means than gears, such as a belt or timing belt. Furthermore, the rotation number ratio R can be arbitrarily selected, and the selection thereof is not restricted at the designing stage.

In the specification of the second encoder 8, supposing that the number of bits is 32, an output from the second encoder 8 takes a value between 0 to $2^{32}-1$. That is, in the case that the output shaft 50 continues to rotate, the output from the second encoder 8 will repeat a value in the range of 0 to $2^{32}-1$. In the position control of the sixth shaft 6, a command position is determined establishing a reference encoder value as a command origin. The reference encoder value is set by, e.g., an operator, and is equivalent to an output value from the second encoder 8 at the working origin position. In the case that any movement command is given in conformity with the program, the reference encoder value is arranged so as to be controlled until an output value from the encoder comes to a position where (encoder output value)=(reference encoder value)+(encoder value of a position movement command amount).

When carrying out the infinite rotation control, the reference encoder value controlled at the infinite rotation control device 12 is moved in sequence by each 360 degrees, thereby achieving the position control at the time of the infinite rotation.

Now, operation of the first embodiment will be hereinafter described. Based on the program, the main control device 10 drives and controls the first to fifth shafts 3 by means of the first servo control device 20. More specifically, the first servo control device 20 causes the first drive 4 to operate based on a signal from the main control device 10, thereby the first to fifth shafts 3 being rotated, and a rotation amount thereof is fed back to the first servo control device 20 by means of the first encoder 5. A signal for controlling rotation of the sixth shaft 6 is inputted to the infinite rotation control device 12 via the main control device 10. In the case that any infinite rotation control is not carried out, the infinite rotation control device 12 uses the signal from the main control device 10 as it is without processing and causes the second servo control device 22 to operate. On the contrary, in the case of carrying out the infinite rotation control, the infinite rotation control device 12 changes the signal from the main control device 10 in conformity with a specified position moving amount thereby operating the second servo control device 22. The second servo control device 22 causes the sixth shaft 6 to rotate by operating the second drive 7, and the rotation amount of the sixth shaft 6 is fed back to the second servo control device 22 by means of the second encoder 8. In this manner, the control section can perform two operations, i.e., normal rotation in response to the control signal from the main control device 10 and infinite rotation control in response to the control signal from the infinite rotation control device 12, to operate. In addition, the CPU 30 in the main control means 10 and the CPU 33 in the infinite rotation control device 12 is arranged so as to exchange at all times information such as infinite rotation implementation state other than the control signal. That is, a value of the second encoder 8 for detecting the rotation of the sixth shaft 6 is transmitted from the second servo control device 22 to the infinite rotation control device 12, further to the main control device 10, and is used for changing an indication of a current value and updating the reference encoder value serving as a reference for the movement control.

Now, the position control at the time of the infinite rotation by means of the infinite rotation control device 12 will be described with reference to flowcharts each showing a control system in FIGS. 4, 5 and 6, and to an explanatory diagram showing a relation between an encoder value and a rotational angle in FIG. 7.

Figure 4:
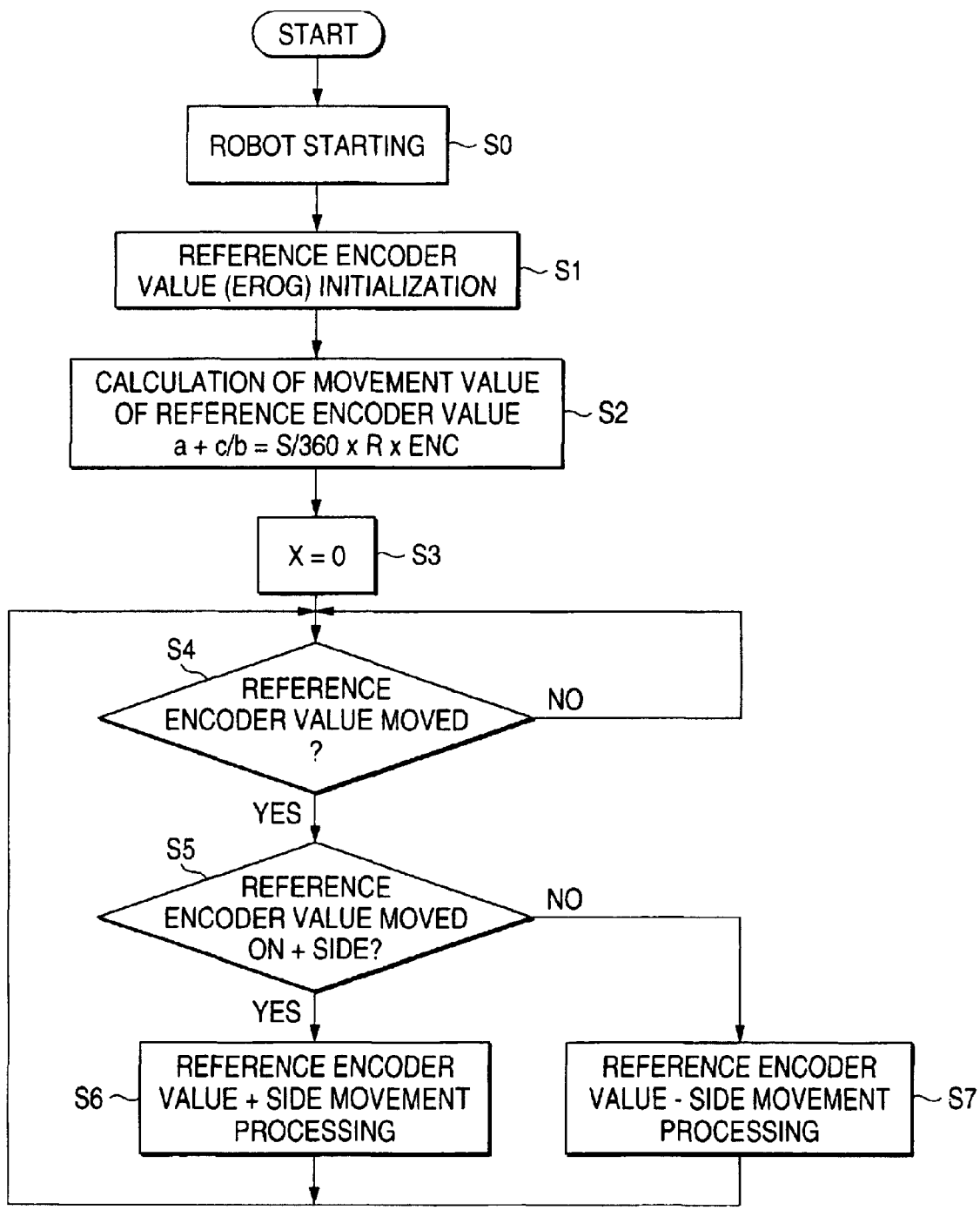
FIG. 4 is a flowchart of a reference encoder position movement process in infinite rotation processing.
Figure 7:
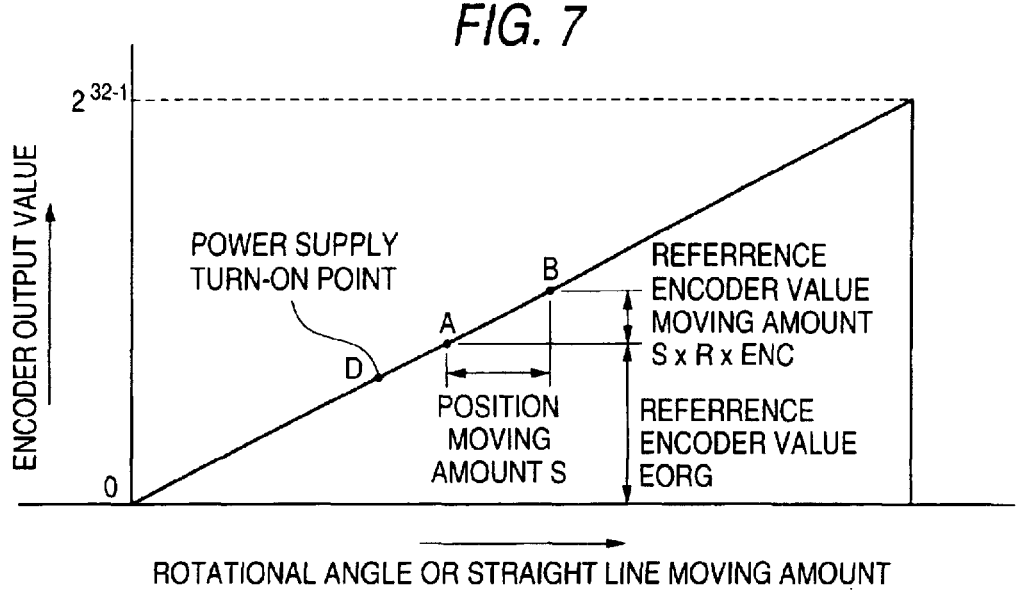
FIG. 7 is an explanatory chart for changing processing the reference encoder value.
Figure 8:
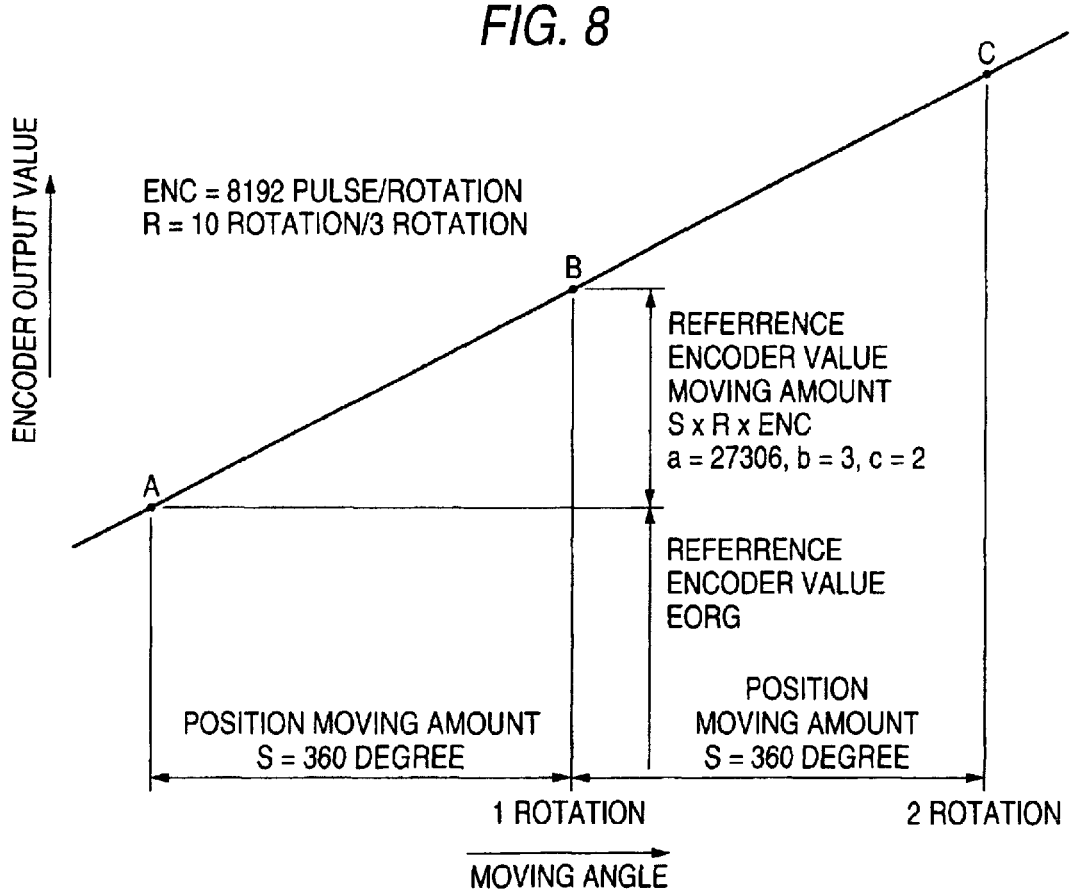
FIG. 8 is an explanatory chart for moving and processing the reference encoder value based on a specific example.

A power supply is turned on in a step 50 in FIG. 4, and the robot starts operation at a position of the sixth shaft 6 indicated by the point D in FIG. 7. Then proceeding to a step S1, a reference encoder value (EORG) at a point A that was set before the power supply is turned off last time is read out from the RAM 34 backed up by the battery. Further establishing the reference encoder value (EORG) as a reference, a parameter of, e.g., each joint stored in the RAM 34 of the control section 1 is initialized. Subsequently in a step S2, using a position moving amount S up to a point B specified by the input means, a reference encoder value moving amount at the time of moving the reference encoder value is calculated. In the calculation of the reference encoder value moving amount, the position moving amount S at the sixth shaft 6, a rotation number ratio R of the deceleration means 53 and a resolution ENC of the second encoder 8 (output amount from the second encoder 8 when the encoder or the drive 7 makes one rotation) are used. FIG. 8 shows a relation between a specific encoder value and a rotational angle, for example, in the case that the position control for the sixth shaft 6 is carried out for each 360. In this case, the position moving amount S=360, and the rotation number ratio R=N/M=10/3 of said reducing speed means 53, and the resolution ENC=8192 of the 2nd encoder 8 are memorized as parameters by the RAM34. Further a moving amount of the reference encoder value is computed as follows:

$$S \times R \times ENC = 81920/3$$

As a result, it becomes a form of a fraction.
The moving amount of this reference encoder value is processed in the form of a mixed fraction, that is, $$a+c/b$$

where: a is an integer part of a moving amount of the reference encoder value, and is a value that is actually added to or subtracted from the reference encoder value. c/b is a fraction part and represents an error, and is used in the case of conducting a compensation in the next time. In the case that both b and c are positive integers, it is convenient because the error can be surely compensated. However, it is preferable that, accurately controlling the c/b as a numerical value of decimal places, when accumulation of the errors comes to be not less than a value detected by the encoder, the accumulated value is added to or subtracted from the reference encoder value, thereby compensating so that the c/b may be less than the value detected by the encoder at all times. For better understanding, following description is given on the assumption that each of the c and b is an integer. If the moving amount of the reference encoder value is an integer as a result of calculating based on the position moving amount S, the rotation number ratio R and the resolution of the encoder, b and c will be set to b=1, and c=0. Under the mentioned conditions, a, b and c becomes following numerical values:

$$a=27306, b=3, C=2$$

These values are stored in the RAM 34 of the infinite rotation control device 12.

Subsequently in a step S3, establishing that a variable X that is a difference between an ideal reference encoder value and an actual encoder value is zero, initialization is executed. The X is a variable that accumulates the values of the c/b that is the above-described error every time the reference encoder value is moved, and is processed so as to be a numerical value less than 1 at all times. The foregoing steps from S0 to S3 are the initialization processing at the time of starting the robot.

Then, in a step S4, whether there is any movement command of the reference encoder value is determined. In the case of the presence of such a movement command, the program proceeds to a step S5. It is preferable that the movement of the reference encoder value is automatically executed in the case that the sixth shaft 6 performs the infinite rotation beyond the operation range specified by the control apparatus, or is executed in response to a command from the program. General expression of such a command in the case of commanding from the program will be as follows:

JRC MULTI, AXIS where: JRC indicates the movement command of the reference encoder value, MULTI indicates a magnification value, and AXIS indicates an axis of moving object.

A specific example of the movement command of the sixth shaft in FIG. 8 will be as follows:

JRC+1, 6

In response to the above-described command, establishing that the sixth shaft is the object axis, the reference encoder value is updated to a value obtained by adding the magnification MULTI (=+1) times the position moving amount S stored as a parameter value, to an original encoder value. In the above-described example, as the position moving amount S=360, a reference encoder value at a point B will be changed and set to be as follows.

(reference encoder value at point B)=(reference encoder value ENC at point A)+27306

When the same command as the above-described command is given again, the reference encoder value will move to a point C.

In addition, though an example of storing the position moving amount S in the control section 1 as a parameter value 360 is shown above, it is preferable that the position moving amount S=360 is directly specified from the command as follows:

JRC+360, 6

It is also possible to prepare and implement a command,

JRC 0 so that an encoder value at a current position may be changed to the reference encoder value.

In the step S4, in the case that there is no movement command for the reference encoder value, the program is required to standby until the movement command for the next reference encoder value is issued, and then a normal program is conducted.

In the step S4, when it is determined that there is a movement command for the reference encoder value, proceeding to a step S5, a content of processing is determined in conformity with a moving direction of the reference encoder value. In the case that the moving direction of the reference encoder value is on the plus (+) side, proceeding to a step S6, a reference encoder value plus (+) side movement processing is implemented as shown in FIG. 5. On the contrary, in the case that the moving direction of the reference encoder value is on the minus (−) side, proceeding to a step S7, a reference encoder value minus (−) side movement processing as shown in FIG. 6 is implemented. When implementing step S6 or S7, returning to step 4, the program is required to stand by until any movement command of the reference encoder value is issued.

Figure 5:
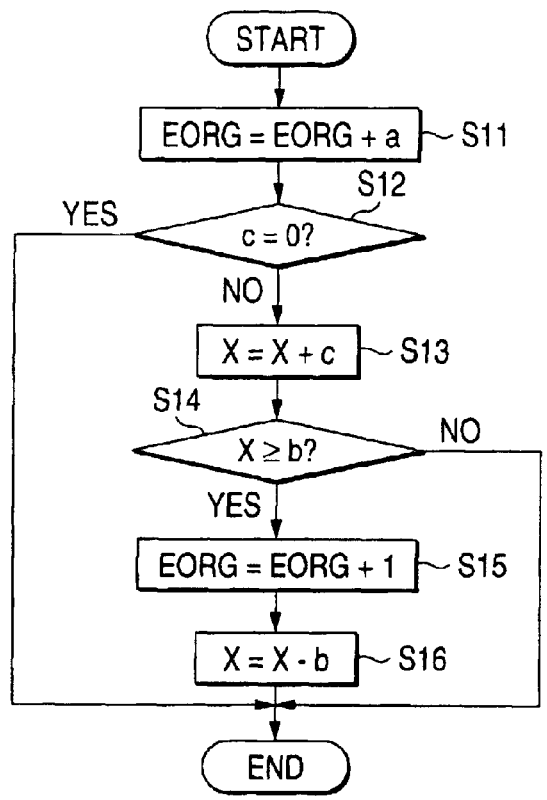
FIG. 5 is a flowchart showing plus side movement process of a reference encoder value in the infinite rotation processing.
Figure 6:
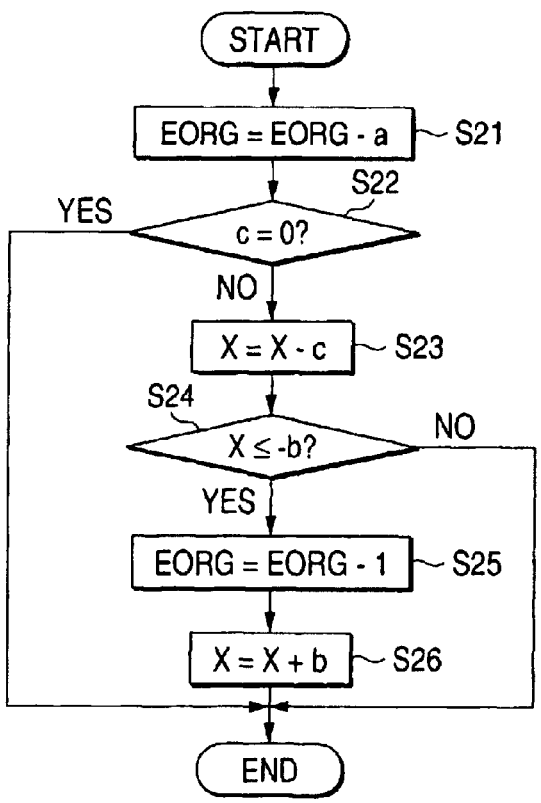
FIG. 6 is a flowchart showing minus side movement processing of a reference encoder value in the infinite rotation processing.

Referring now to FIG. 5, the reference encoder value plus (+) side movement processing of the step S6 will be described. First, in step S11, an integer part a of a moving amount of the reference encoder value that is calculated from, e.g., the position moving amount S, is added to a reference encoder value EORG. Then in a step S12, whether or not there is any fraction part of the moving amount of the reference encoder value is confirmed. In the case where c=0, that is a fraction part of the moving amount of the reference encoder value is zero, the reference encoder value plus (+) side moving amount processing ends. In the case that c is not zero, that is, a fraction part of the reference encoder moving amount is not zero, the program proceeds to step S13.

In step S13, the c is added to a difference value X. Next in step S14, the X and b are compared to confirm which is larger. In the case of X<b, a difference between the ideal reference encoder value and the actual reference encoder value is less than 1 in encoder detection unit, and therefore the reference encoder value plus (+) side movement processing ends. In the case of X≧b, a difference between the ideal reference encoder value and the actual reference encoder value becomes not less than 1 in encoder detection unit, and therefore the program proceeds to step S15.

In the step S15, to compensate the reference encoder value EORG, 1 is added to the EORG. Subsequently in a step S16, the b is subtracted from the difference value X thereby bringing a state of 0≦X<b, that is, a state in which the difference between the ideal reference encoder value and the actual reference encoder value is less than 1 in encoder detection unit. Then the reference encoder value plus (+) side movement processing comes to end.

Now with reference to FIG. 6, the reference encoder value minus (−) side movement processing in the step S7 will be described. First in a step S21, an integer part a of the moving amount of the reference encoder value is subtracted from a reference encoder value EORG. Then in a step S22, whether or not there is any fraction part in the moving amount of the reference encoder value is confirmed. In the case of c=0, that is, the fraction part of the reference encoder moving amount is zero, the reference encoder value minus (−) side moving amount processing comes to end. In the case that the c is not zero, that is, the fraction part of the reference encoder moving amount is not zero, the program proceeds to a step S23.

In the step S23, the c is subtracted from the difference value X. Then in step 24, the X and −b are compared to confirm which is larger. In the case of X>−b, a difference between the ideal reference encoder value and the actual encoder value is less than 1 in encoder detection unit, and then the reference encoder value minus (−) side movement processing comes to end. In the case of X≦−b, a difference between the ideal reference encoder value and the actual reference encoder value is less than 1 in encoder detection unit, and therefore the program proceeds to a step S25.

In the step S25, to compensate the reference encoder value EORG, 1 is subtracted from the EORG. Subsequently in step S26, the b is added to the difference value X thereby bringing a state of 0≦−X<b, that is, a state in which a difference between the ideal reference encoder value and the actual reference encoder value is less than 1 in encoder detection unit. Then the reference encoder value minus (−) side movement processing comes to end.

Embodiment 2

Figure 9:
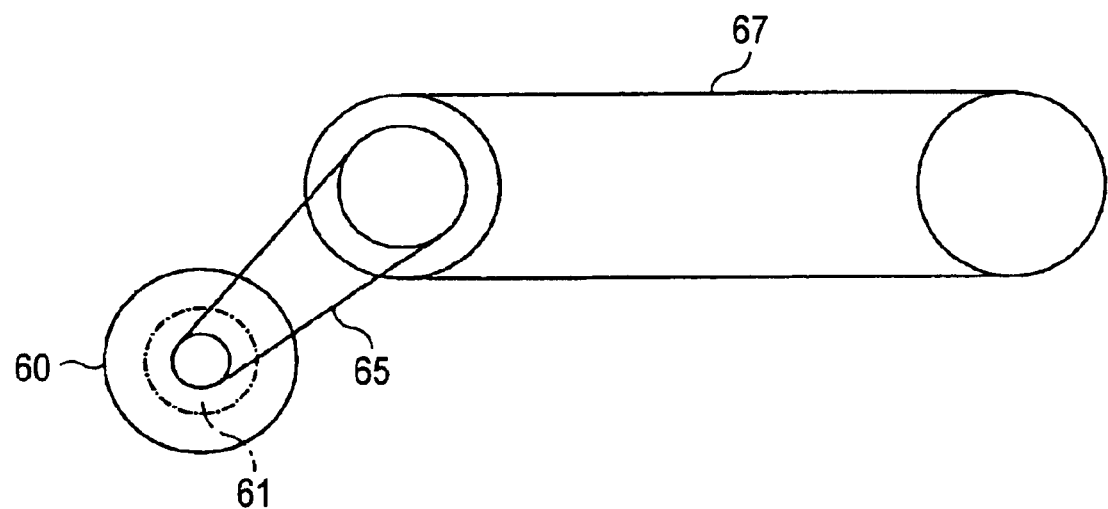
FIG. 9 is a schematic view of a conveyor showing Embodiment 2.
Figure 10:
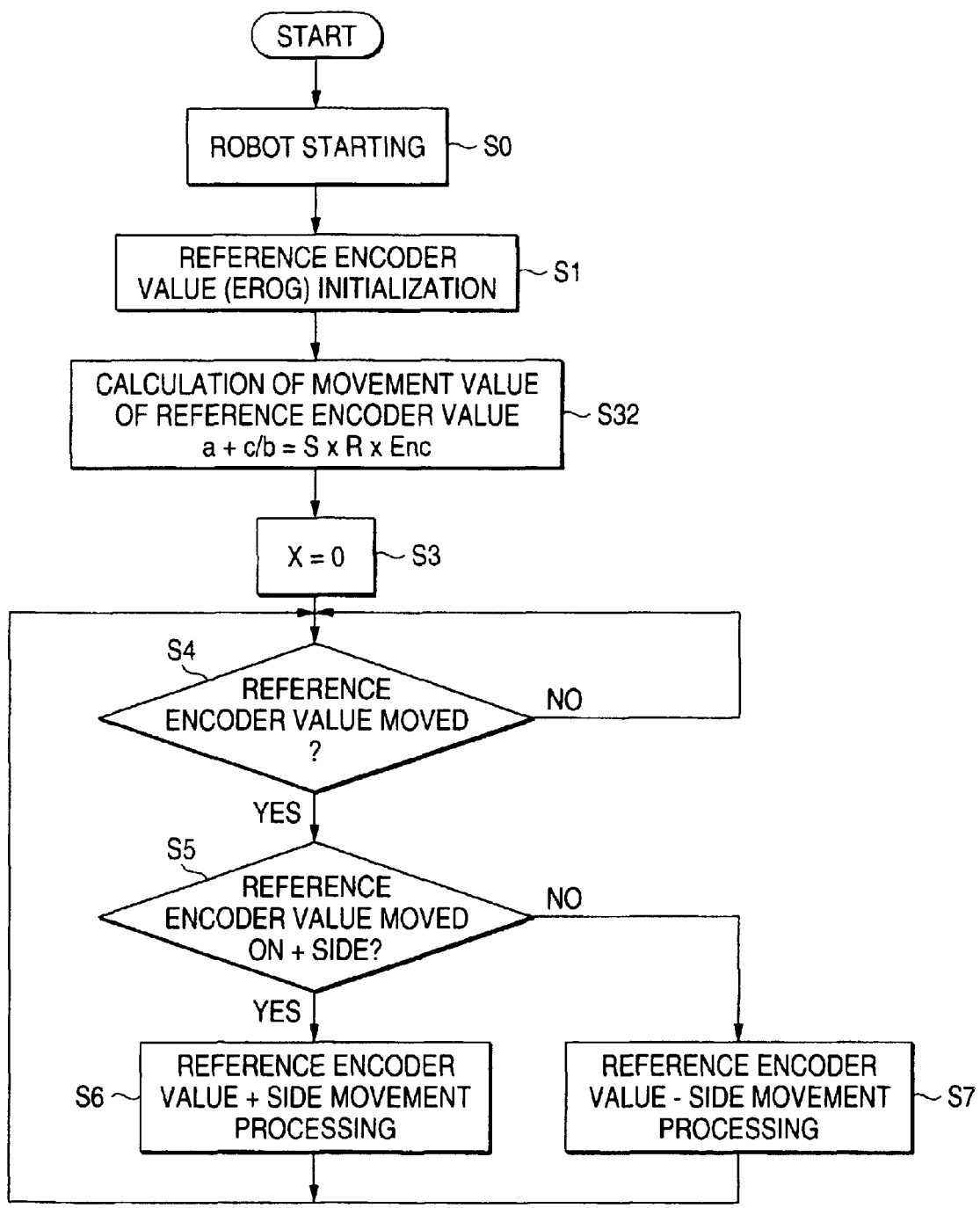
FIG. 10 is a flowchart of moving and processing the reference encoder value according to Embodiment 2.
Figure 11:
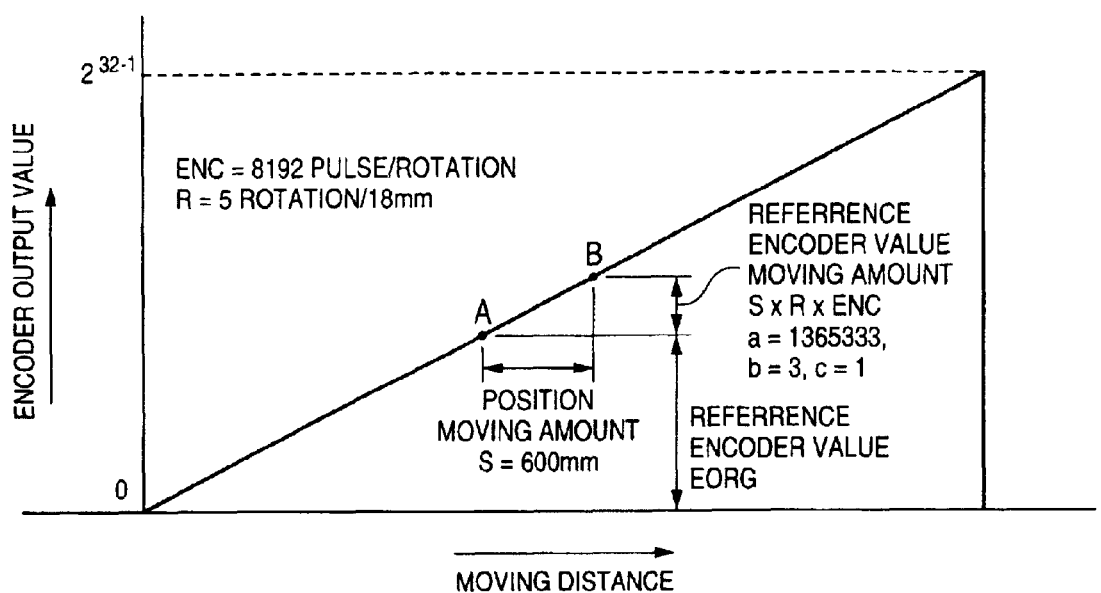
FIG. 11 is an explanatory chart for moving and processing the reference encoder value according to the Embodiment 2.

A second preferred embodiment in the case of applying the invention to a conveyor is hereinafter described with reference to a schematic view of FIG. 9, a flowchart of FIG. 10 and an explanatory chart regarding a relation between an encoder value and a moving distance of FIG. 11. As shown in FIG. 9, when a drive 60 makes N rotations (e.g., 5 rotations), a conveyor 67 travels by Mmm (e.g., 18 mm), and a relation of this operation is indicated by an operation ratio R (=N/M, e.g.,=5/18). A difference from the arrangement in flowcharts of FIGS. 4, 5 and 6 regarding the movement processing of the reference encoder value in the infinite rotation control of the robot wrist shaft exists in using a moving distance in place of an angle in the calculation of a moving amount of the reference encoder value shown in a step S32 of FIG. 10. To calculate a moving amount of the reference encoder value, a position moving amount S in the conveyor 67, an operation ratio R of deceleration means 65 and a resolution ENC of an encoder 61 are used. For example, as shown in FIG. 11, in the case that conveying work is conducted by repeating a position control of the conveyor 67 to move in one direction in the range of 0 to 600 mm every time, the position moving amount S=600 mm is specified. Further, setting an initial reference encoder value EORG to be an encoder output value at point A, the position control for the conveyor 67 is carried out based on the program. When setting the reference encoder value EORG to an encoder output value at point B after completing a series of works, it becomes possible to conduct the position control of the conveyor 67 by establishing a position of the point B as an origin, i.e., a position of 0 mm.

Supposing that rotation number N of the above-described drive 60 equal 5 rotations and the moving amount M of the above-described conveyor 67 equal 18 mm, the operation ratio R of the deceleration means 65 is 5/18. Further supposing that the above-described resolution of the encoder 61 is 8192, a moving amount of the reference encoder value will be in the form of the following fraction:

$$S \times R \times ENC = 4096000/3$$

When this moving amount of the reference encoder is represented in a form of a mixed fraction of a +c/b, specific numerical values of the a, b and c will be as follows:

$$a=1365333, b=3, c=1$$

As to the processing other than in the step 32, quite the same processing as in the foregoing Embodiment 1 is carried out, thus the infinite movement processing about a linearly moving shaft can be achieved.

Embodiment 3

Figure 12:
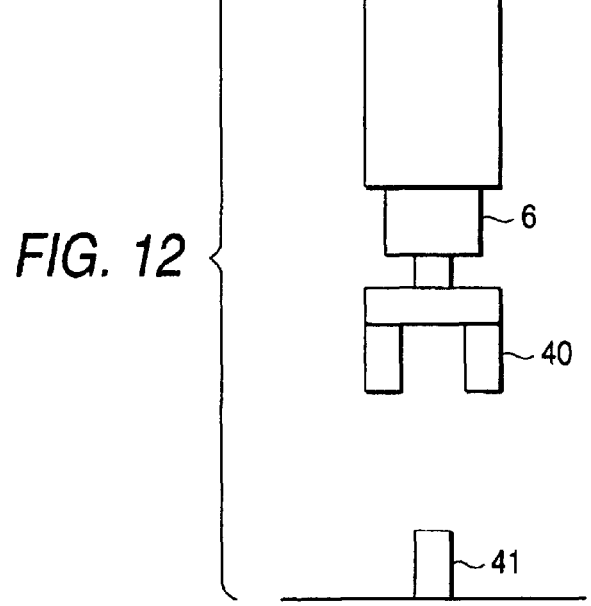
FIG. 12 is a schematic view showing a hand part of a robot according to Embodiment 3.
Figure 13:
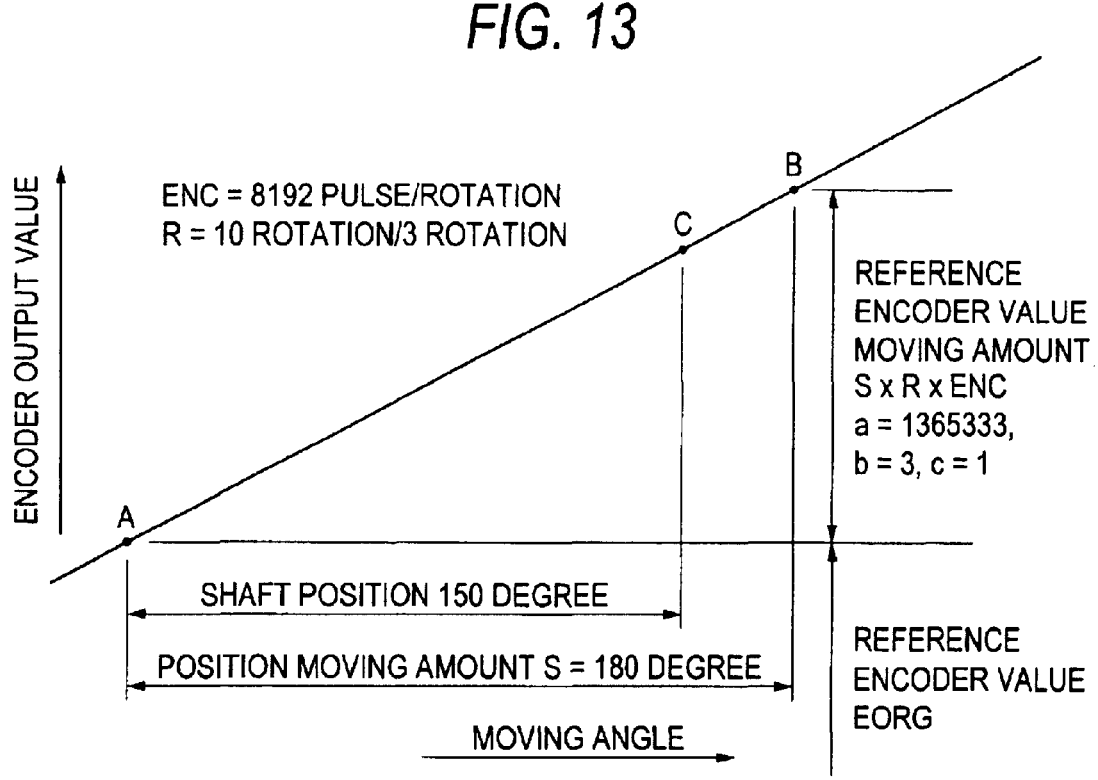
FIG. 13 is an explanatory chart for moving and processing the reference encoder value according to Embodiment 3.

Embodiment 3 for applying the infinite rotation control apparatus according to this invention to a pick place work is hereinafter described with reference to FIGS. 12 and 13. There is provided a holding device 40 fixed to the sixth shaft 6, and this holding device 40 carry out the work holding an object 41 to be conveyed. The holding device 40 holds the object 41 to be conveyed in the form of holding it from both sides thereof. Further even if the holding device 40 rotates 180 degrees, quite the same work can be performed. That is, in the state that the sixth shaft 6 is at an angle of 0° as well as in the state that the sixth shaft 6 is at an angle of 180°, it is possible to perform quite the same holding work.

In such a work, the holding device 40 holds the object 41 to be conveyed in the state of the sixth shaft 6 being at an angle of 0 and performs a series of works, and thereafter the holding device 40 lets the object 41 off in the state of the sixth shaft 6 being at an angle of 150 thus completing one work. In the next work to be continuously performed for conveying the next article to be conveyed, it has been hitherto necessary to start the next work after moving the sixth shaft 6 from the state of 150° to the state of 0. That is, it is required to start the next work after waiting for the returning movement of the sixth shaft 6 by 150 degrees.

To apply the invention to such kind of work, the position moving amount is set to 180 degrees, for continuously conducting the conveyance work of the next article to be conveyed after completing the previous work, the following command is executed from the program.

JWC 180, 6

This command changes the reference encoder value to a value equivalent to the position of 180 degrees in the state that the sixth shaft 6 is at an angle of 150 degrees. As a result, point B will be changed to a new reference encoder value. After the change, the position of the sixth shaft comes to be −30 viewed from the origin. Then, by giving a movement command of 0 from the program, the sixth shaft 6 arrives at the origin after the rotation of +30, whereby it becomes possible to start the work for the next article to be conveyed. Thus being different from the prior art, it is not required to move by 150 degrees, and consequently, it is possible to shorten a time for the work repeatedly carried out.

Embodiment 4

Figure 14:
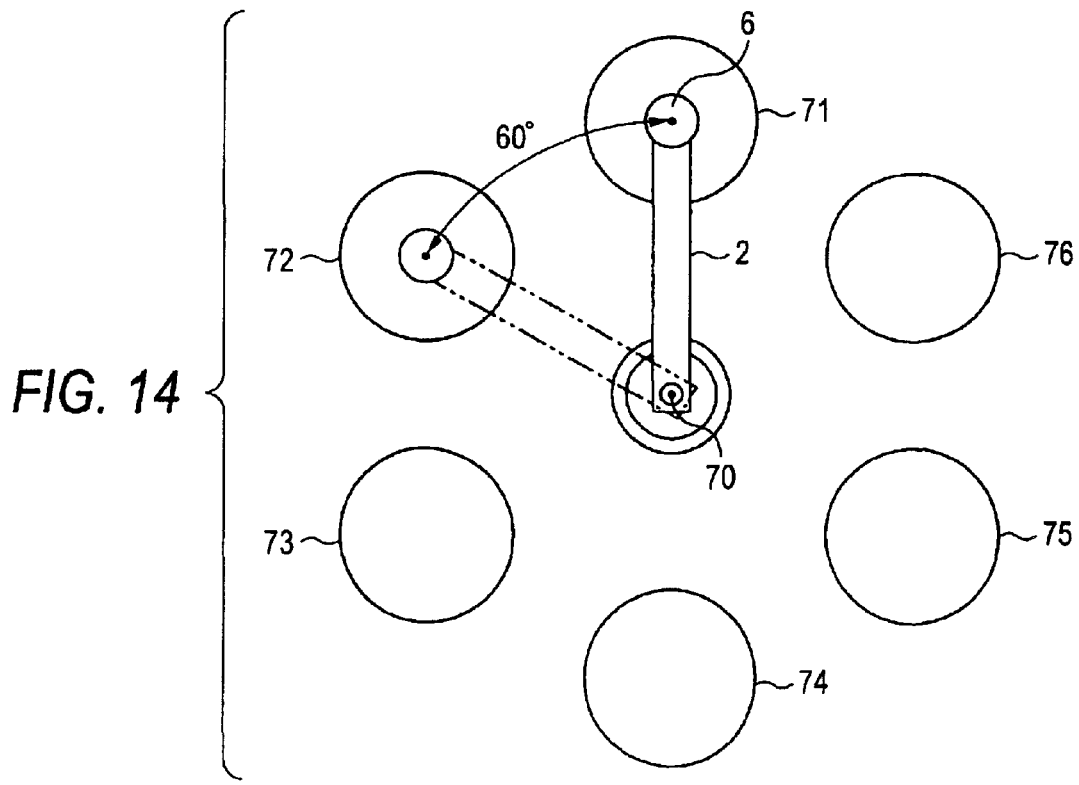
FIG. 14 is a schematic view of a robot and work platform showing Embodiment 4.

An example of applying the infinite rotation control apparatus according to the invention to a work, in which the same work is carried out at a plurality of work platforms, is hereinafter described with reference to FIG. 14. This drawing is a schematic plan view showing a state of disposing a robot 2 and six work platforms (first work platform 71, second work platform 72, third work platform 73, fourth work platform 74, fifth work platform 75 and sixth work platform 76). The six work platforms are disposed at equal intervals circumferentially (in the case of the drawing, 60 degrees) about a first shaft 70 serving as a strut of the robot 2. The work carried out at each work platform is of the same content as that in the first work platform 71. An article to be worked on each work platform is located at a position of turning it on the first work platform 71 by each 60 about the first shaft 70 of the robot 2. A series of works are carried out such that after completing the work at the first work platform 71, then the same work is carried out in sequential order at the second work platform 72, the third work platform 73 and so on. The works are carried out up to completing the work at the sixth work platform 76, and thereafter the works are repeatedly carried out from the first work platform 71 again.

For carrying out these works, conventionally, it has been necessary either to conduct a position instruction for the robot at each of the whole six work platforms, or to prepare and operate a program replacing position data of the first work platform 71 with other position data for turning by 60 about the first shaft 70.

On the other hand, in the infinite rotation control according to this invention applied to the first shaft 70 serving as being the strut of the robot 2 at each time of completing the work at each work platform, the following command is executed from the program:

JRC 60, 1

This command is conducted establishing that the position moving amount of the reference encoder value of the first shaft 70 is 60. Accordingly it becomes possible to repeatedly carry out the same work as in the first work platform 71 at each of the remaining five work platforms using the position data of the work at the first work platform 71. That is, by applying the invention, any position instruction or position data preparation work at each work platform is not necessary.

Industrial Applicability

As described above, a control system for a conveying apparatus according to the present invention is suitable for the use at a conveying work in which execution of a program is repeatedly conducted.

What is claimed is:

1. A conveying apparatus for conveying articles, comprising conveying means and control means for controlling operation thereof, said conveying means including:

a control shaft;

a drive for driving said control shaft;

deceleration means provided between said control shaft and said drive; and a position detector for detecting an operation amount of said control shaft and mounted on either of said rotary shaft or said drive, said control means including:

a servo control device for driving and controlling said drive based on a movement command from a program;

reference encoder value storage means for storing as a reference encoder value an output value from said position detector at an origin of the program;

parameter storage means for storing a resolution of said position detector and a rotation ratio of the deceleration means; and command means for changing said reference encoder value of said reference encoder value storage means, wherein said control means further includes computing means in which, in the case that a command is issued from said command means, an encoder value equivalent to a position moving amount commanded from said command means is added to or subtracted from said reference encoder value, and said reference encoder value storage means stores a value obtained by such subtraction or addition as a new reference encoder value.

2. The conveying apparatus according to claim 1, wherein in the case of issuance of a command from the command 10 means, a current value is changed in conformity with the new reference encoder value.

3. The conveying apparatus according to claim 1, wherein said position moving amount issued from said command means is either a distance or an angle.

4. The conveying apparatus according to claim 1, further comprising:

difference storage means for storing a difference between the reference encoder value calculated by said computing means and an actually set reference encoder value; and compensation means for compensating and outputting said difference in the case of changing the next reference encoder value.

5. A conveying apparatus for conveying articles, comprising conveying means and control means for controlling operation thereof, said conveying means including:

a control shaft;

a drive for driving said control shaft;

deceleration means provided between said control shaft and said drive; and a position detector for detecting an operation amount of said control shaft and mounted on either of said rotary shaft or said drive, said control means including:

a servo control device for driving and controlling said drive based on a movement command from a program;

reference encoder value storage means for storing as a reference encoder value an output value from said position detector at an origin of the program;

parameter storage means for storing a resolution of said position detector, a rotation ratio of the deceleration means, and a position moving amount in distance or angle; and detection means for detecting an output value from said position detector, wherein said control means further includes operation means in which, in the case that an output value detected from said detection means is a value obtained by addition or subtraction between an encoder value equivalent to said position moving amount and said reference encoder value, said reference encoder value storage means stores said value obtained by addition or subtraction as a new reference encoder value.

6. The conveying apparatus according to claim 5, wherein a moving amount of the reference encoder value is directly specified as an output value from the encoder.

7. The conveying apparatus according to claim 5, wherein in the case of issuance of a command from command means, a current value is changed in conformity with a new reference encoder value.

8. The conveying apparatus according to claim 5 further comprising:

difference storage means for storing a difference between the reference encoder value calculated by the computing means and an actually set reference encoder value; and compensation means for compensating and outputting said difference in the case of changing the next reference encoder value.

\* \* \* \* \*